(12) United States Patent
Kim

(10) Patent No.: US 11,662,771 B2
(45) Date of Patent: May 30, 2023

(54) DISPLAY DEVICE

(71) Applicant: LG Display Co., Ltd., Seoul (KR)

(72) Inventor: JunHyung Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/534,120

(22) Filed: Nov. 23, 2021

(65) Prior Publication Data
US 2022/0171429 A1    Jun. 2, 2022

(30) Foreign Application Priority Data

Dec. 2, 2020 (KR) .................. 10-2020-0166359

(51) Int. Cl.
*G06F 1/16* (2006.01)
(52) U.S. Cl.
CPC .......... *G06F 1/1624* (2013.01); *G06F 1/1652* (2013.01); *G06F 1/1656* (2013.01)
(58) Field of Classification Search
CPC .... G06F 1/1624; G06F 1/1652; G06F 1/1656; G06F 1/1628; G09F 9/301; H01L 51/5237; H01L 2251/5338
See application file for complete search history.

(56) References Cited

U.S. PATENT DOCUMENTS

| | | | |
|---|---|---|---|
| 9,560,750 B2* | 1/2017 | Lee | H05K 1/028 |
| 10,481,641 B2* | 11/2019 | Lee | G06F 1/1652 |
| 11,012,546 B1* | 5/2021 | Song | H04M 1/0237 |
| 11,029,733 B2* | 6/2021 | Lee | G06F 1/1652 |
| 11,032,920 B2* | 6/2021 | Kim | G02F 1/1333 |
| 11,051,413 B2* | 6/2021 | Yang | G06F 1/1626 |
| 11,315,443 B2* | 4/2022 | Han | G06F 1/1652 |
| 2018/0014417 A1* | 1/2018 | Seo | H05K 1/189 |
| 2018/0077808 A1* | 3/2018 | Seo | G06F 3/044 |
| 2020/0152095 A1* | 5/2020 | Lee | G06F 1/1641 |
| 2022/0113764 A1* | 4/2022 | Kwak | H04M 1/0237 |

FOREIGN PATENT DOCUMENTS

KR    10-2014-0059274 A    5/2014

* cited by examiner

*Primary Examiner* — Rockshana D Chowdhury
(74) *Attorney, Agent, or Firm* — Birch, Stewart, Kolasch & Birch, LLP

(57) ABSTRACT

A display device includes a display panel including a first display area and a second display area extended from the first display area, a support member that supports the first display area, a bottom cover coupled to the support member, an inner case configured to bend a part of the second display area and to be movable along an extension direction of the display panel, and a sub-plate disposed between the inner case and the second display area so as to be extended from an end portion of the support member. In a first mode, the first display area and the second display area overlap each other with the inner case interposed therebetween. In a second mode, an end portion of the second display area overlaps another portion of the second display area. Therefore, a step between a first display area and a second display area can be reduced.

20 Claims, 11 Drawing Sheets

DISPLAY DEVICE

CROSS-REFERENCE TO RELATED APPLICATIONS

This application claims priority to Korean Patent Application No. 10-2020-0166359 filed on Dec. 2, 2020, in the Korean Intellectual Property Office, the entire contents of which are hereby expressly incorporated herein by reference into the present application.

BACKGROUND

Field

The present disclosure relates to a display device, and more particularly, to a display device in which the durability of a display panel can be enhanced.

Description of the Related Art

Recently, with the advancement of the information age, the field of display devices for visually displaying electrical information signals has grown rapidly. Thus, studies for developing performance such as thinning, weight lightening, and low power consumption, of various display devices have continued.

Specifically, flat panel display devices can include, for example, a liquid crystal display device using a light emitting diode (LED) as a light source, and an organic light emitting diode display device using a self-emitting OLED. Such flat panel display devices have been attracting a lot of attention as the next-generation display devices due to their small thickness and low power consumption. Particularly, in recent years, flexible display devices, such as a bendable display device, a foldable display device or a rollable display device, are being developed.

Such a flexible display device can be implemented by forming a substrate with a plastic material. When the flexible display device is folded, it can be simply carried. Further, when the flexible display device is unfolded, a large screen can be implemented. Therefore, the flexible display device can be applied to various fields including not only mobile equipment, such as a mobile phone, an electronic book, or electronic newspaper, but also a television or a monitor.

SUMMARY OF THE DISCLOSURE

An object to be achieved by the present disclosure is to provide a display device in which a first display area and a second display area of a display panel are sufficiently supported.

Another object to be achieved by the present disclosure is to provide a display device in which a step between a first display area and a second display area can be reduced.

Objects of the present disclosure are not limited to the above-mentioned objects, and other objects, which are not mentioned above, can be clearly understood by those skilled in the art from the following descriptions.

According to an aspect of the present disclosure, a display device includes a display panel including a first display area and a second display area extended from the first display area; a support member that supports the first display area; a bottom cover coupled to the support member; an inner case configured to bend a part of the second display area and to be movable along an extension direction of the display panel; and a sub-plate disposed between the inner case and the second display area so as to be extended from an end portion of the support member. In a first mode, the first display area and the second display area overlap each other with the inner case interposed therebetween. In a second mode, an end portion of the second display area overlaps the second display area, e.g., another portion of the second display area.

According to another aspect of the present disclosure, a display device includes a display panel including a main display area and a sub-display area; a support member that supports the main display area; a sub-plate disposed to be extended from the support member and configured to support the sub-display area; a bottom cover coupled to a bottom portion of the support member; and a sliding case configured to bend a part of the sub-display area and to be movable toward an outside or an inside of a space between the support member and the bottom cover. The sub-plate is disposed between the sub-display area and the sliding case and configured to reduce a step between a top surface of the support member and a top surface of the sliding case.

Other detailed matters of the exemplary embodiments are included in the detailed description and the drawings.

According to the present disclosure, it is possible to enhance the durability of a display panel by including a support member that supports a first display area and a sub-plate that supports a second display area.

According to the present disclosure, the sub-plate can have the same thickness as the support member and is extended from an end portion of the support member. Therefore, it is possible to enhance the strength of the display panel.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1A:
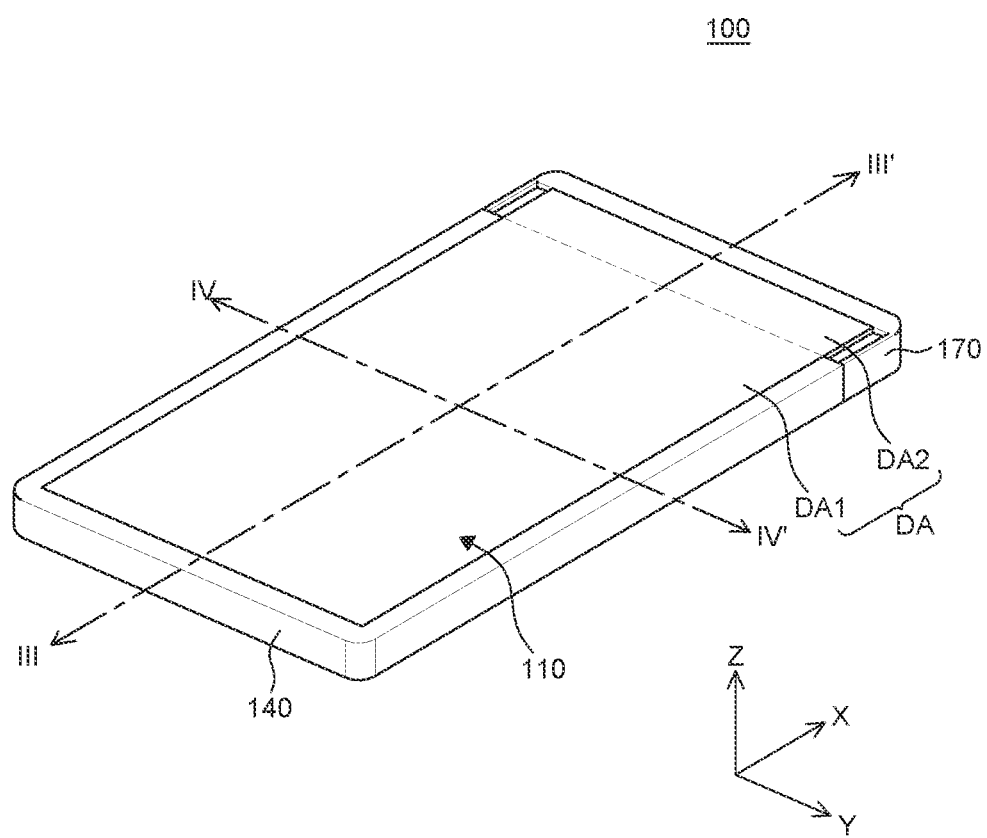
FIG. 1A is a perspective view of a display device in a first mode according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, the present disclosure will be described in detail with reference to accompanying drawings.

Figure 1B:
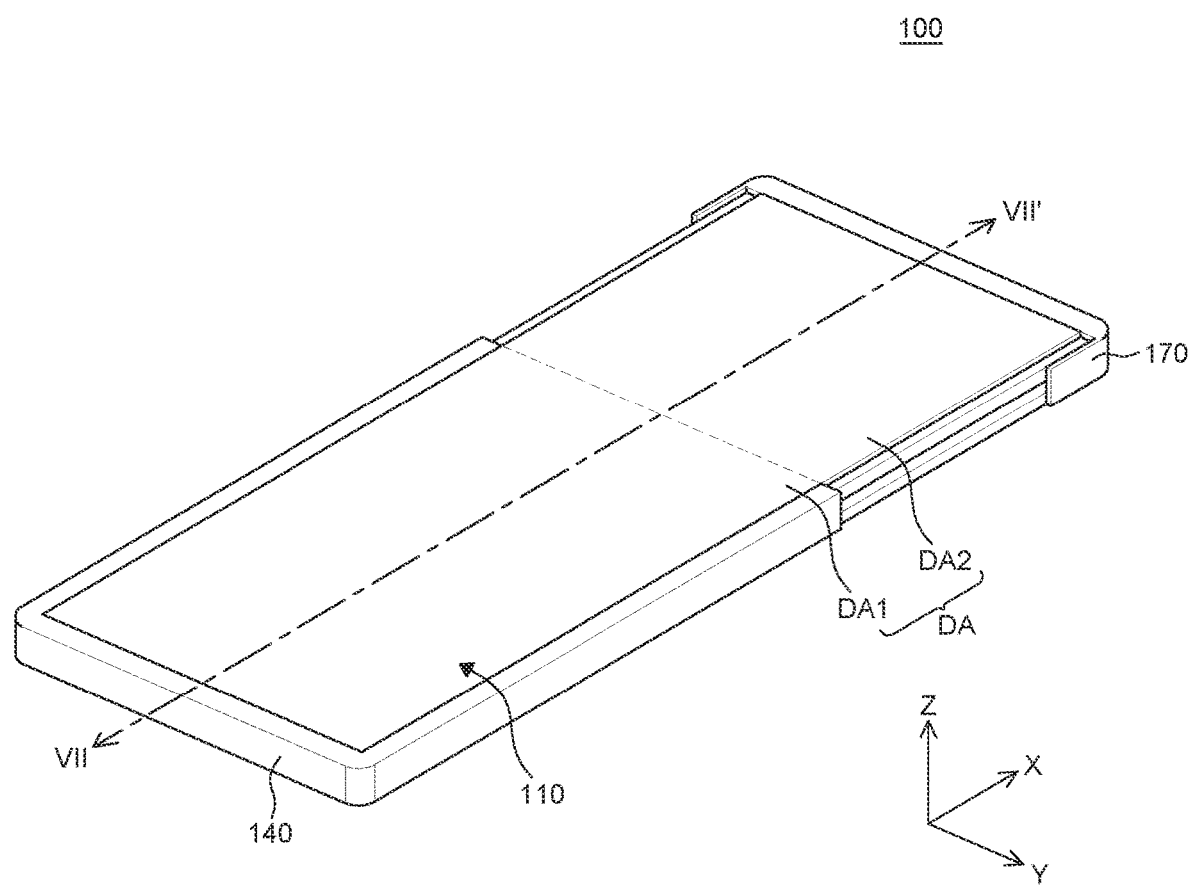
FIG. 1B is a perspective view of the display device in a second mode according to an exemplary embodiment of the present disclosure.

FIG. 1A is a perspective view of a display device in a first mode according to an exemplary embodiment of the present disclosure. FIG. 1B is a perspective view of the display device in a second mode according to an exemplary embodiment of the present disclosure. All the components of each display device according to all embodiments of the present disclosure are operatively coupled and configured.

Referring to FIG. 1A and FIG. 1B, a display device 100 according to an exemplary embodiment of the present disclosure can be a slidable display device in which the size of a screen of a display panel 110 can be changed. For example, the display device 100 has a slidable structure and thus can be increased or decreased in size of the screen.

Specifically, FIG. 1A illustrates a first mode in which the size of the screen of the display device 100 is contracted to a minimum size. Also, FIG. 1B illustrates a second mode in which the size of the screen of the display device 100 is expanded to a maximum size. Thus, the first mode can be defined as a contraction mode or a minimum mode, and the second mode can be defined as an expansion mode or a maximum mode.

The display panel 110 includes a display area DA on which an image is actually displayed. Here, the size of the display area DA exposed on a front surface of the display device 100 can be defined as the size of the screen. The display area DA can include a first display area DA1 and a second display area DA2 extended from the first display area DA1 in a first direction (e.g., X-axis direction). The first display area DA1 can be a main display area exposed on the front surface of the display device 100 in the first mode and the second mode. The second display area DA2 is a sub-display area, and the size of the second display area DA2 exposed on the front surface of the display device 100 can be changed by a sliding operation.

Specifically, in the first mode, a part of the second display area DA2 can be bent so as to be disposed inside the display device 100. Therefore, in the first mode, the size of the display area DA exposed on the front surface of the display device 100 can be the smallest.

In the second mode, one side of the display device 100 can slide in the first direction. Specifically, a back case 170 of the display device 100 and components connected thereto can be slid in a direction getting away from the first display area DA1. Thus, a part of the second display area DA2 can be moved from an inside of the display device 100 to the front surface of the display device 100. As such, in the second mode, the size of the display area DA exposed on the front surface of the display device 100 can be the largest.

In other words, the display device 100 can move a part of the second display area DA2 toward an inside or an outside of the display device 100. Thus, the size of the screen of the display device 100 can be changed. When the back case 170 is moved in the first direction so as to be away from the first display area DA1, the size of the second display area DA2 to be exposed can increase. Thus, the size of the screen of the display device 100 can be expanded. On the contrary to this, when the back case 170 is moved in the first direction so as to be close to the first display area DA1, the size of the second display area DA2 to be exposed can decrease. Thus, the size of the screen of the display device 100 can be contracted.

A part of the second display area DA2 adjacent to the first display area DA1 can be exposed on the front surface of the display device 100 in both the first mode and the second mode. For example, in the present disclosure, a part of the display area DA corresponding to a bottom cover 140 is defined as the first display area DA1 and the other part is defined as the second display area DA2. However, the present disclosure is not limited thereto. A user can perform a slide operation of the display device 100 by pushing or pulling the back case 170, but the present disclosure is not limited thereto. Also, the display device 100 can be defined as a bendable display device or an expandable display device, but is not limited thereto.

Hereinafter, a specific structure of the display device 100 will be described.

Figure 2:
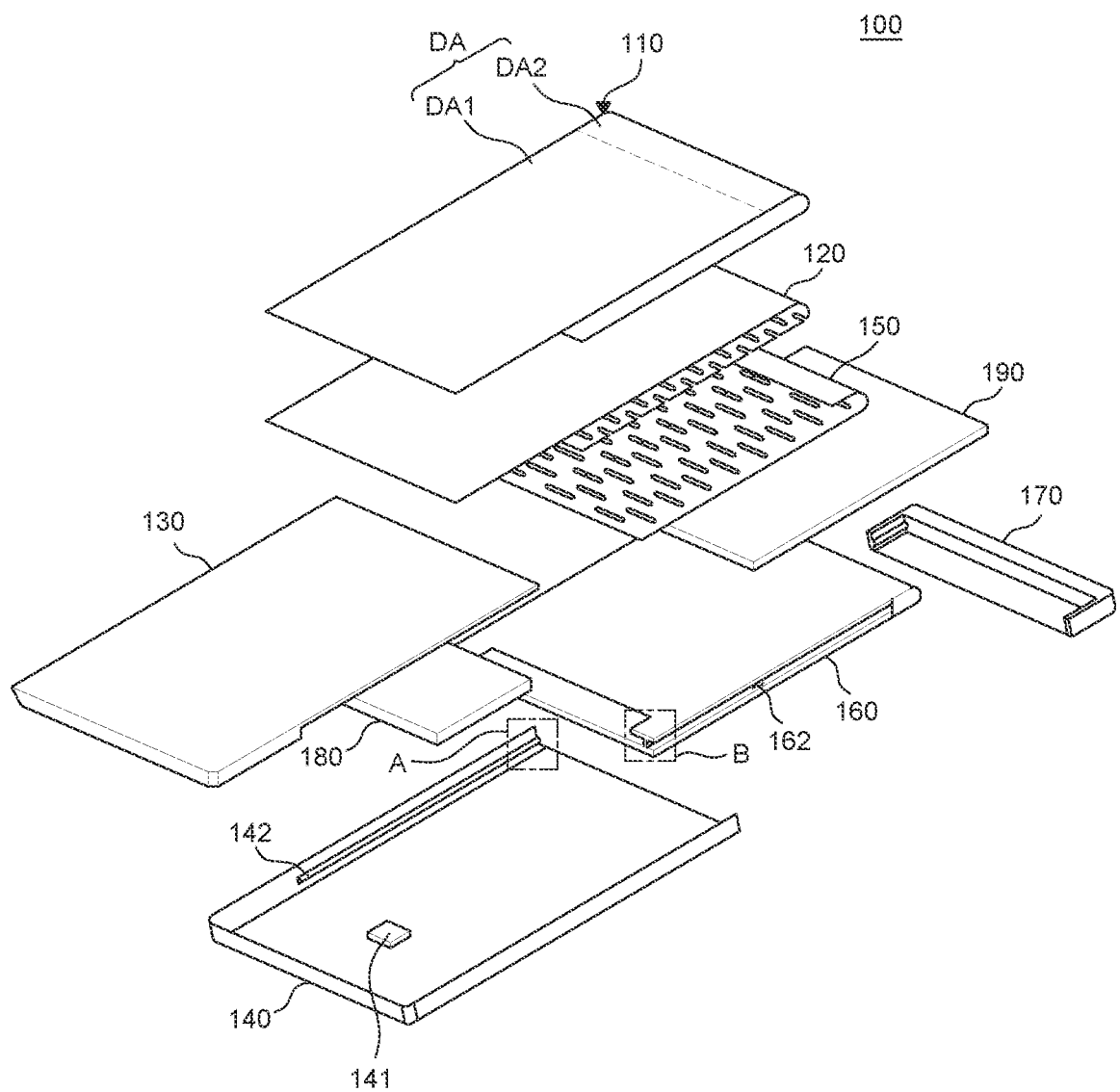
FIG. 2 is an exploded perspective view of FIG. 1A.
Figure 3:
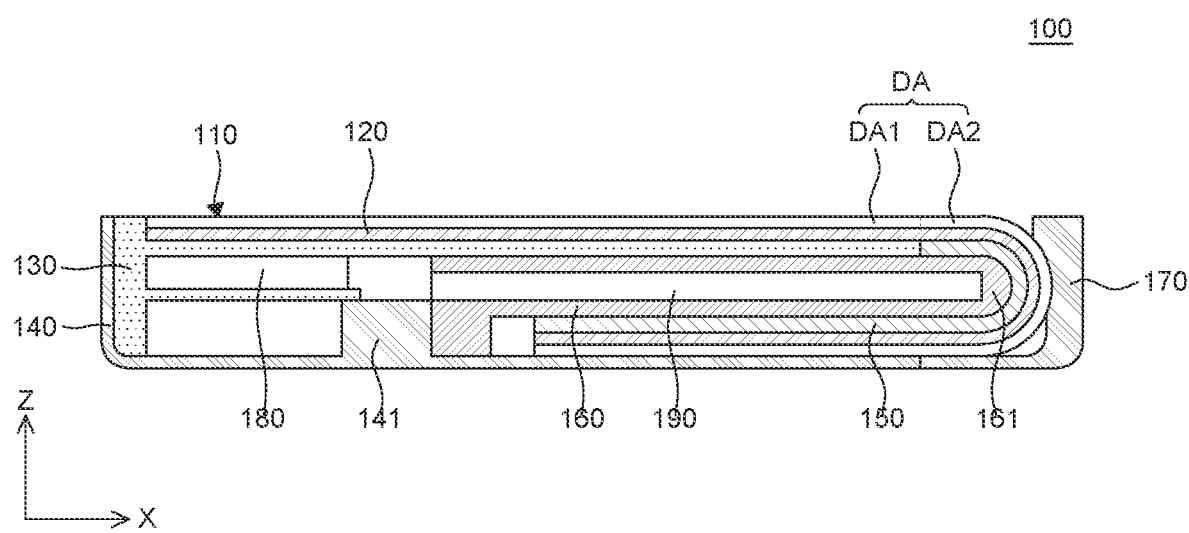
FIG. 3 is a cross-sectional view as taken along a line of FIG. 1A.
Figure 4:
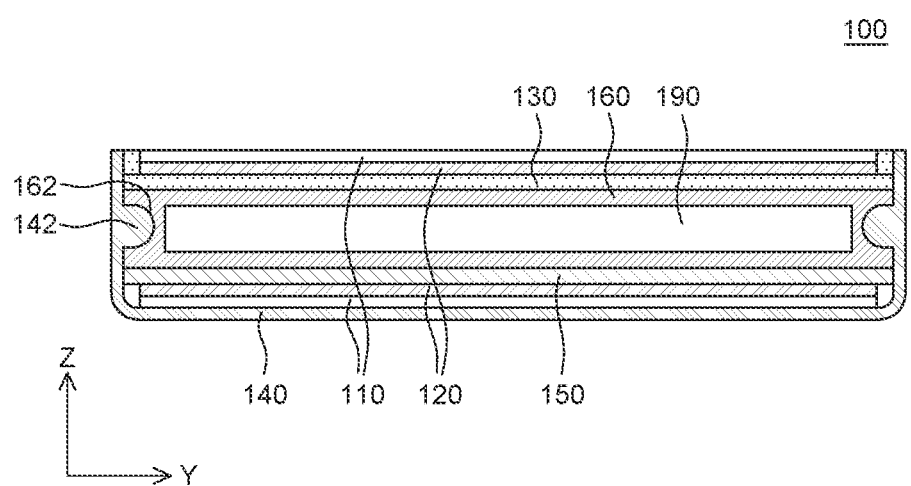
FIG. 4 is a cross-sectional view as taken along a line IV-IV' of FIG. 1A.
Figure 5A:
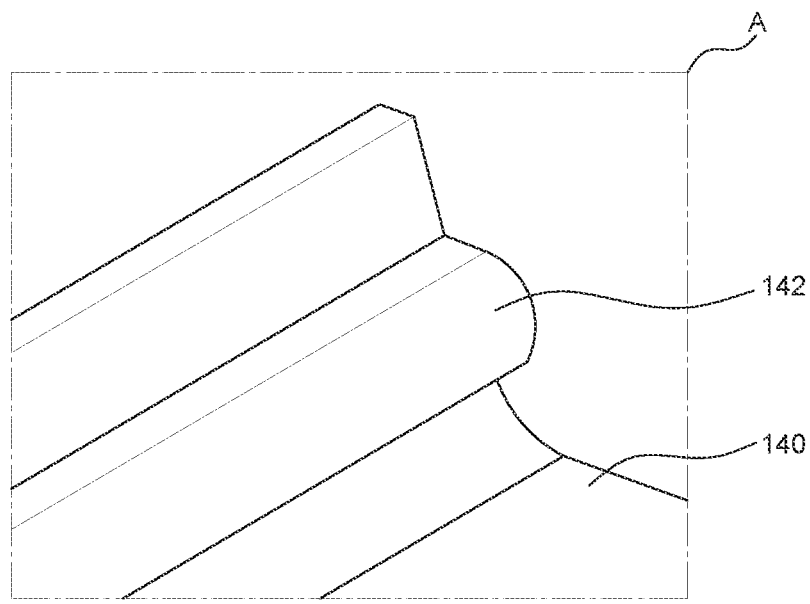
FIG. 5A and FIG. 5B are enlarged views of a region A and a region B, respectively, of FIG. 2.
Figure 5B:
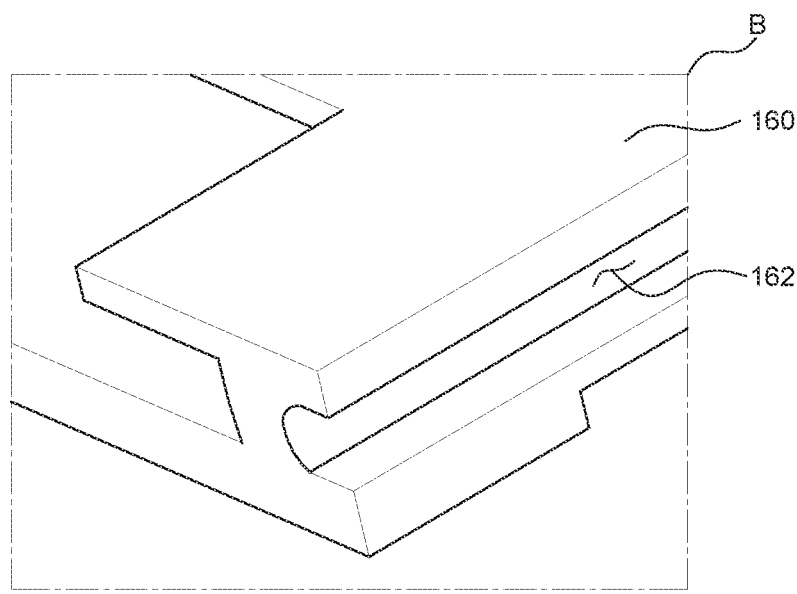

FIG. 2 is an exploded perspective view of FIG. 1A. FIG. 3 is a cross-sectional view as taken along a line III-III' of FIG. 1A. FIG. 4 is a cross-sectional view as taken along a line IV-IV' of FIG. 1A. FIG. 5A and FIG. 5B are enlarged views of a region A and a region B, respectively, of FIG. 2.

Referring to FIG. 2 through FIG. 5B, the display device 100 includes the display panel 110, a back plate 120, a support member 130, the bottom cover 140, a sub-plate 150, an inner case 160, the back case 170, a main board 180 and a battery 190.

The display panel 110 is configured to display an image to the user and can be flexible. For example, the display panel 110 can be made of a flexible material that can be bent or folded. The display panel 110 includes a plurality of pixels and a plurality of driving circuits and can display an image by combining lights emitted from the plurality of pixels. The display panel 110 can be an organic light emitting display panel in which organic light emitting diodes are formed corresponding to the plurality of pixels on a flexible plastic substrate, but is not limited thereto.

A part of the display panel 110 can be bent between the inner case 160 and the back case 170. Here, the first display area DA1 can be continuously fixed to the front surface of the display device 100. The size of the second display area DA2 exposed on the front surface can be changed by switching between the first mode and the second mode. Specifically, a part of the second display area DA2 can be bent, and the size of the exposed second display area DA2 can be changed depending on a bending position. The bending position of the second display area DA2 can be changed as the inner case 160 is slid. Details thereof will be described later.

The back plate 120 is disposed to be in contact with a rear surface of the display panel 110. The back plate 120 can support the display panel 110. A part of the back plate 120 corresponding to the second display area DA2 can include a plurality of holes. The plurality of holes can improve the flexibility of the back plate 120. Therefore, a part of the back plate 120 can be easily bent together with the second display area DA2. The back plate 120 can have the same size as the display panel 110, but is not limited thereto.

The support member 130 is disposed on a rear surface of the back plate 120. The support member 130 can support the display panel 110 and the back plate 120. Particularly, referring to FIG. 3, the support member 130 can correspond to the first display area DA1 of the display panel 110 and support the first display area DA1. Here, the thickness of the support member 130 supporting the first display area DA1 can be greater than that of the back plate 120. Therefore, the support member 130 can sufficiently support the display panel 110 and the back plate 120. However, the thickness of the support member 130 is not limited thereto.

The support member 130 can fix an end portion of the display panel 110. For example, an end portion of the first display area DA1 and the back plate 120 corresponding thereto can be fixed to the support member 130. Thus, even when a slide operation of the display device 100 is performed, the first display area DA1 can be continuously fixed to the front surface of the display device 100.

The bottom cover 140 is coupled to a bottom portion of the support member 130. A space can be formed between the bottom cover 140 and the support member 130. Specifically, the space can be formed between the bottom cover 140 that overlaps the first display area DA1 and the support member 130. In this space, the inner case 160 can be disposed. For example, the inner case 160 can be moved and slid in the first direction between the bottom cover 140 and the support member 130.

The bottom cover 140 can include a stopper 141 and a sliding guide 142. As shown in FIG. 3, the stopper 141 can protrude from a bottom surface of the bottom cover 140 toward the display panel 110. The stopper 141 can be in contact with an end portion of the inner case 160 in the first mode. For example, the stopper 141 can suppress a more inward movement of the inner case 160 during switching from the second mode to the first mode. As shown in FIG. 4 and FIG. 5A, the sliding guide 142 can protrude from an inner side surface of the bottom cover 140. Particularly, the sliding guide 142 can be provided as a pair of sliding guides respectively disposed on inner side surfaces of the bottom cover 140 facing each other. The sliding guide 142 can protrude toward the inner case 160. The sliding guide 142 can correspond to a guide groove 162 of the inner case 160 to be described later and guide a movement of the inner case 160.

The sub-plate 150 is disposed on the rear surface of the back plate 120. The sub-plate 150 can support the display panel 110 and the back plate 120. Particularly, referring to FIG. 3, the sub-plate 150 can correspond to the second display area DA2 of the display panel 110 and support the second display area DA2. The sub-plate 150 can include a plurality of holes. Here, the plurality of holes in the sub-plate 150 can be identical in size and number to the plurality of holes in the back plate 120. The plurality of holes can improve the flexibility of the sub-plate 150. Therefore, the sub-plate 150 can be easily bent together with the second display area DA2. The thickness of the sub-plate 150 supporting the second display area DA2 can be greater than that of the back plate 120. Therefore, the sub-plate 150 can sufficiently support the display panel 110 and the back plate 120. Also, the width of the sub-plate 150 in a second direction (e.g., Y-axis direction) can be greater than that of the display panel 110. However, the thickness and width of the sub-plate 150 are not limited thereto.

The sub-plate 150 can be disposed to be extended from an end portion of the support member 130. Particularly, the sub-plate 150 can have the same thickness as the support member 130 that is disposed in the same line as the sub-plate 150. Thus, the sub-plate 150 can eliminate a step which can be formed between the first display area DA1 and the second display area DA2 in the second mode. Details thereof will be described later.

The inner case 160 is disposed inside the space between the support member 130 and the bottom cover 140. The inner case 160 can be slid toward an outside or an inside of the space in the first direction. For example, the inner case 160 can be a sliding case that is slid to switch the display device 100 to the first mode or the second mode. Here, the inner case 160 includes the guide grooves 162 corresponding to the sliding guides 142 of the bottom cover 140. As shown in FIG. 4 and FIG. 5B, the guide grooves 162 can have a predetermined depth from both side walls of the inner case 160. The sliding guide 142 of the bottom cover 140 can be coupled to the guide grooves 162 of the inner case 160. Thus, the inner case 160 can be easily slid in the first direction in the space between the support member 130 and the bottom cover 140.

The inner case 160 includes a bending part 161 having a certain radius of curvature. The bending part 161 can be disposed at the end portion of the inner case 160. The display panel 110, the back plate 120 and the sub-plate 150 can be bent along the bending part 161 of the inner case 160. Here, since the bending part 161 has a radius of curvature, stress can be reduced during bending of the display panel 110, the back plate 120 and the sub-plate 150.

The back case 170 is coupled to the inner case 160.

The back case 170 can be moved together with the inner case 160. Specifically, the inner case 160 can be slid in the first direction by pulling or pushing the back case 170. The back case 170 can be disposed to face the bending part 161 of the inner case 160. Also, the back case 170 can be disposed to cover a bending part of the display panel 110. Therefore, the display panel 110, the back plate 120 and the sub-plate 150 can be bent between the back case 170 and the bending part 161.

The main board 180 is disposed inside the space between the support member 130 and the bottom cover 140. For example, the main board 180 can be placed inside a receiving part formed by the support member 130. The main board 180 is connected to the display panel 110 and configured to transmit various signals for driving the display panel 110.

The battery 190 is disposed inside the inner case 160. The battery 190 can be charged by being supplied with power from the outside and can generate power required for the display panel 110 and the main board 180.

In the first mode of the display device 100, the inner case 160 has been moved as much as possible in a direction getting close to the end portion of the first display area DA1. For example, when the display device 100 is switched to the first mode, the inner case 160 can be moved in the first direction toward the inside of the space between the support member 130 and the bottom cover 140. The inner case 160 can be moved to the inside of the space described above until the inner case 160 comes into contact with the stopper 141. A movement of the inner case 160 can be stopped by the stopper 141, and switching to the first mode can be completed. Meanwhile, a bottom end portion of the back case 170 that moves together with the inner case 160 can be in contact with a bottom end portion of the bottom cover 140. Therefore, all the internal components of the display device 100 except parts exposed on the front surface of the display device 100 can be disposed inside a space formed by the support member 130, the bottom cover 140 and the back case 170. For example, all the internal components of the display device 100 can be protected by the support member 130, the bottom cover 140 and the back case 170 against an external environment.

In the first mode, a part of the display panel 110 can be disposed on the front surface of the display device 100 and the other part can be disposed inside the display device 100. Specifically, referring to FIG. 3, a part of the second display area DA2 can be bent so as to be disposed under the first display area DA1. Here, the first display area DA1 and the second display area DA2 can overlap each other with the inner case 160 interposed therebetween. Also, in the first mode, the size of an overlap area between the first display area DA1 and the second display area DA2 can be the largest. An end portion of the second display area DA2 can be disposed inside the space between the support member 130 and the bottom cover 140. Particularly, the end portion of the second display area DA2 can overlap the first display area DA1.

For example, the display panel 110 can be bent at the part of the second display area DA2 adjacent to the first display area DA1. Thus, most of the second display area DA2 can be located under the inner case 160. Therefore, in the first mode, the size of the screen of the display device 100 can be the smallest.

The bending position of the second display area DA2 can be changed as the inner case 160 and the back case 170 are slid. For example, the size of the second display area DA2 exposed on the front surface of the display device 100 can be changed as the bending position of the second display area DA2 is changed. Herein, the bending position can correspond to a curved surface of the bending part 161. Hereinafter, the second mode of the display device 100 will be described with reference to FIG. 6 and FIG. 7.

Figure 6:
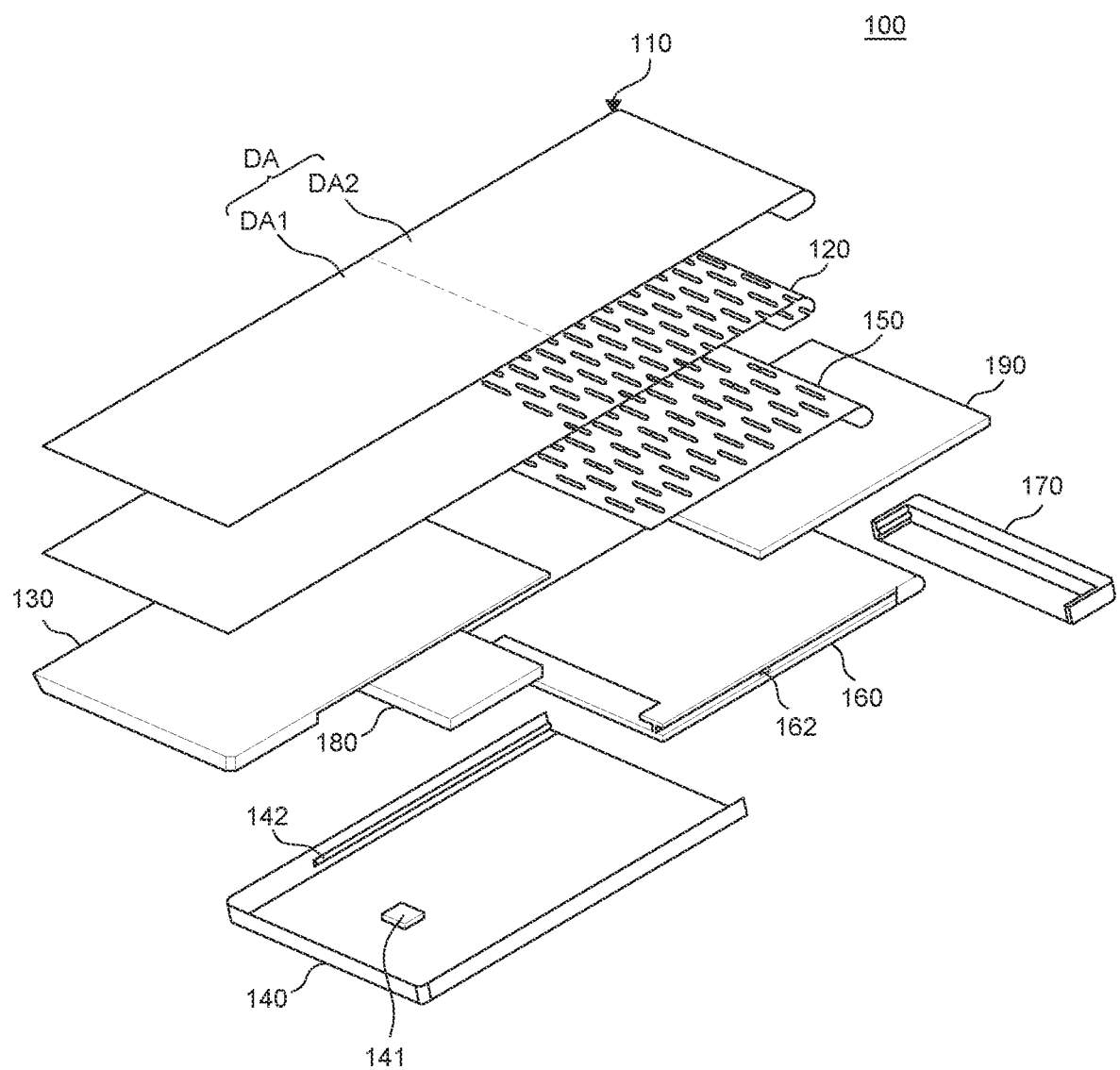
FIG. 6 is an exploded perspective view of FIG. 1B.
Figure 7:
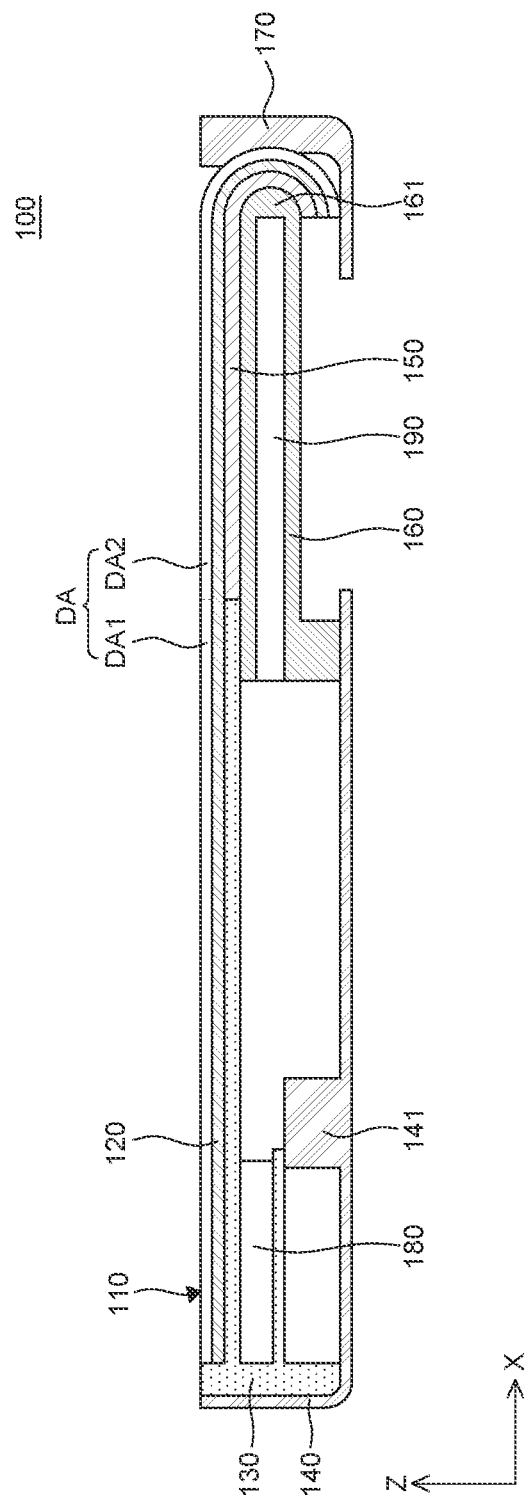
FIG. 7 is a cross-sectional view as taken along a line VII-VII' of FIG. 1B.

FIG. 6 is an exploded perspective view of FIG. 1B. FIG. 7 is a cross-sectional view as taken along a line VII-VII' of FIG. 1B.

Referring to FIG. 6 and FIG. 7, in the second mode of the display device 100, the inner case 160 has been moved as much as possible in a direction getting away from the end portion of the first display area DA1. For example, when the display device 100 is switched to the second mode, the inner case 160 can be moved in the first direction toward the outside of the space between the support member 130 and the bottom cover 140. Another stopper or the like can stop a movement of the inner case 160 when the display device 100 is switched to the second mode. Meanwhile, in the second mode, the back case 170 can be spaced apart from the bottom cover 140. Here, a space between the back case 170 and the bottom cover 140 can correspond to the inner case 160. Therefore, all the internal components of the display device 100 can be protected by the support member 130, the bottom cover 140, the inner case 160 and the back case 170 against an external environment.

In the second mode, most of the display panel 110 can be disposed on the front surface of the display device 100. Specifically, the first display area DA1 and the second display area DA2 do not overlap each other. Thus, all the display panel 110 except a part bent on the curved surface of the bending part 161 can be exposed on the front surface of the display device 100. The end portion of the second display area DA2 can be disposed outside the space formed by the support member 130 and the bottom cover 140. Further, the end portion of the second display area DA2 can overlap the second display area DA2, e.g., another portion of the second display area DA2. For example, the display panel 110 can be bent at a part of the second display area DA2 adjacent to the end portion of the second display area DA2. Thus, most of the second display area DA2 can be located on the front surface of the display device 100. Therefore, in the second mode, the size of the screen of the display device 100 can be the largest.

As described above, the bending position of the second display area DA2 can be changed as the inner case 160 and the back case 170 are moved. For example, during switching from the first mode to the second mode, the bending position of the second display area DA2 can be changed from the part adjacent to the first display area DA1 to a part away from the first display area DA1. During switching from the second mode to the first mode, the bending position of the second display area DA2 can be changed from the part away from the first display area DA1 to the part adjacent to the first display area DA1. Based on the bending position, the part of the second display area DA2 adjacent to the first display area DA1 is exposed on the front surface of the display device 100. Also, the other part of the second display area DA2 away from the first display area DA1 is disposed inside the display device 100. Thus, the size of the exposed second display area DA2 can be changed depending on the bending position, and the size of the screen of the display device 100 can be expanded or contracted.

In general, a slidable display device is configured to expand or contract the size of a screen by moving a sliding case. If the sliding case is disposed inside the slidable display device, a main display area of a display panel disposed at a top portion of the sliding case can be sufficiently supported by the sliding case. However, if an inner case is moved toward the outside, no structure for supporting the main display area is present under the main display area of the display panel. Thus, the durability of the display panel can be degraded.

The display device 100 according to the present disclosure includes the support member 130 that supports the first display area DA1 of the display panel 110. Thus, the first display area DA1 of the display panel 110 can be sufficiently supported regardless of the position of the inner case 160. Also, a space can be formed between the support member 130 and the bottom cover 140 and the internal components of the display device 100 can be disposed in this space. Thus, the internal components can be protected against an external environment. Therefore, the durability of the display device 100 can be enhanced.

The display device 100 can further include the sub-plate 150 that supports the second display area DA2. Here, the sub-plate 150 can include a plurality of holes. Therefore, the sub-plate 150 can be smoothly bent together with the second display area DA2 while supporting the second display area DA2.

Particularly, the sub-plate 150 can be extended from the end portion of the support member 130 that supports the first display area DA1. Also, the sub-plate 150 can have the same thickness as the support member 130. Thus, when the first display area DA1 and the second display area DA2 are disposed in the same line in the second mode, the sub-plate 150 can eliminate a step between the first display area DA1 and the second display area DA2. Specifically, the inner case 160 is configured to be movable inside the space between the support member 130 and the bottom cover 140, and, thus, a step is formed between a top surface of the inner case 160 and a top surface of the support member 130. To eliminate the step, the sub-plate 150 can be disposed between the inner case 160 and the second display area DA2. For example, the sub-plate 150 can be disposed to fill a space between the back plate 120 corresponding to the second display area DA2 and the inner case 160. Therefore, it is possible to reduce a step which can be formed in the display panel 110 and improve the reliability of the display device 100.

Figure 8:
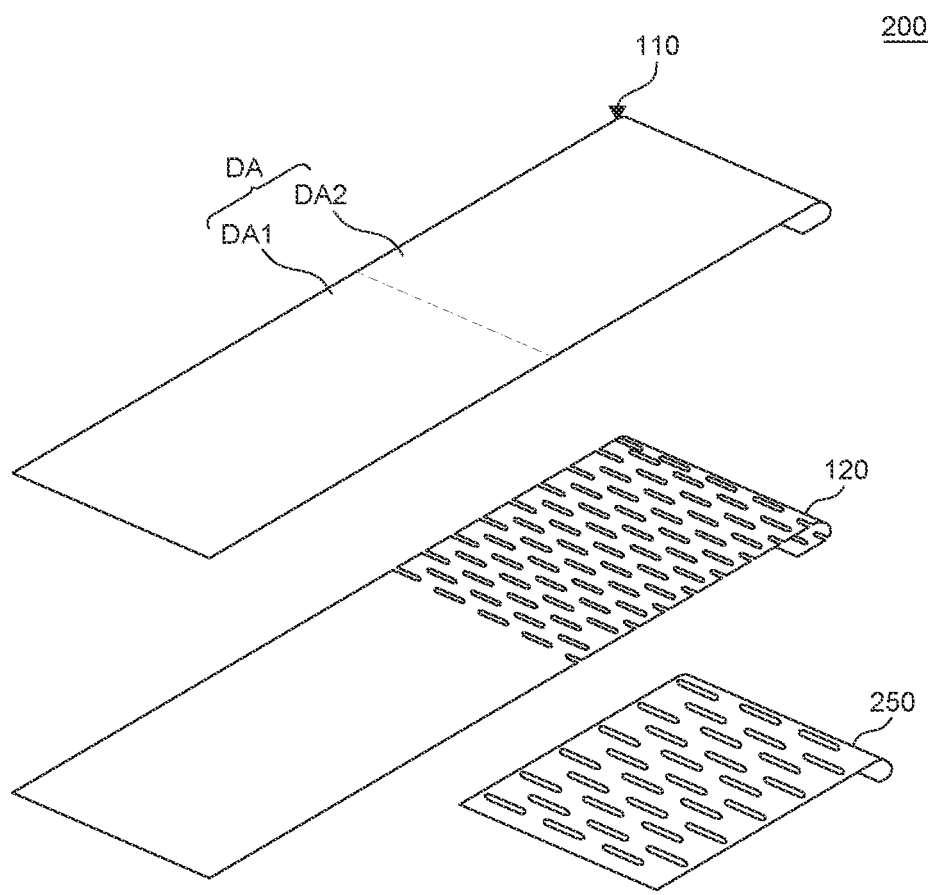
FIG. 8 is a perspective view of a display device according to another exemplary embodiment of the present disclosure.

FIG. 8 is a perspective view of a display device according to another exemplary embodiment of the present disclosure. A display device 200 shown in FIG. 8 has substantially the same configuration as the display device 100 shown in FIG. 1 through FIG. 7 except a sub-plate 250. Thus, for convenience of description, FIG. 8 illustrates the display panel 110, the back plate 120 and the sub-plate 250 among the components of the display device 200, and a repeated description will be omitted or may be briefly provided.

Referring to FIG. 8, each of the back plate 120 and the sub-plate 250 corresponding to the second display area DA2 of the display panel 110 includes a plurality of holes. The plurality of holes can improve the flexibility of the back plate 120 and the sub-plate 250. Thus, when the second display area DA2 is bent, the back plate 120 and the sub-plate 250 can also be easily bent.

The plurality of holes in the sub-plate 250 is different in number and size from the plurality of holes in the back plate 120. Specifically, the plurality of holes in the sub-plate 250 can be smaller in number than the plurality of holes in the back plate 120. Also, the plurality of holes in the sub-plate 250 can be larger in size than the plurality of holes in the back plate 120. For example, the plurality of holes in the sub-plate 250 can be relatively large in size and small in number. Thus, the sub-plate 250 can have a greater strength while maintaining flexibility.

Specifically, as the total area of the plurality of holes increases, the flexibility increases, but the strength can decrease. As the total area of the plurality of holes decreases, the flexibility decreases, but the strength can increase. Thus, it is possible to further enhance the strength of the sub-plate 250 by minimizing the total area of the plurality of holes to the extent of maintaining the flexibility. Therefore, it is possible to further enhance the durability of the second display area DA2.

Figure 9A:
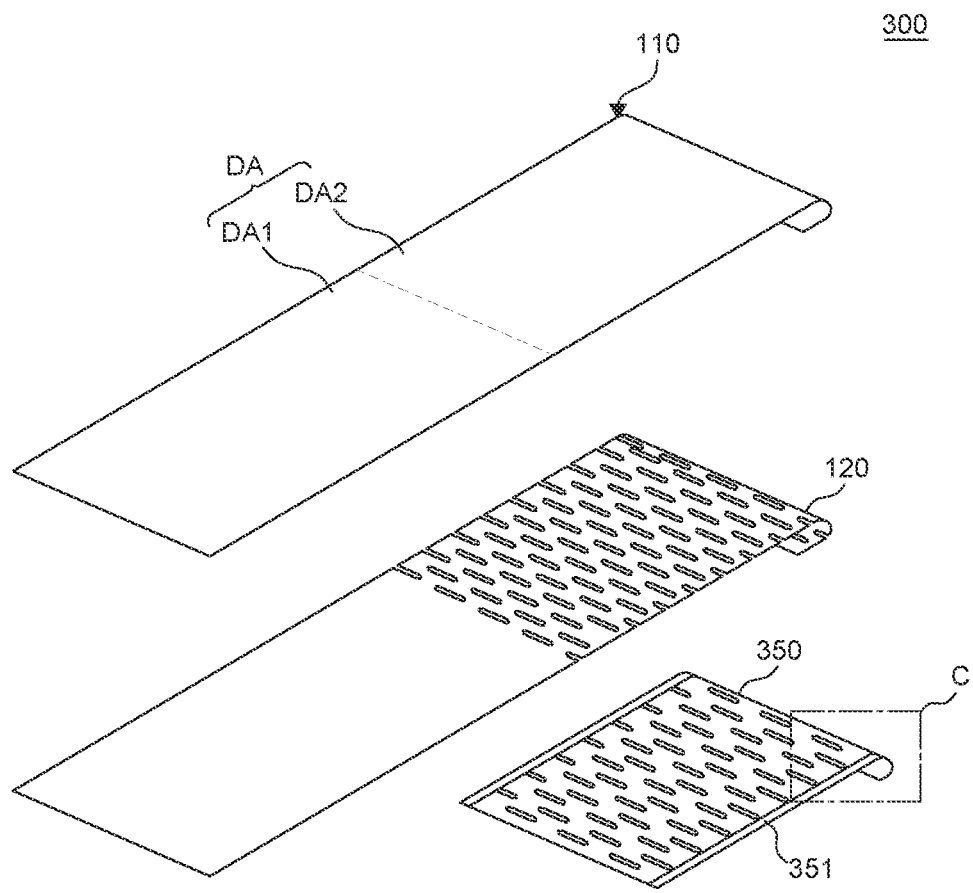
FIG. 9A is a perspective view of a display device according to yet another exemplary embodiment of the present disclosure.
Figure 9B:
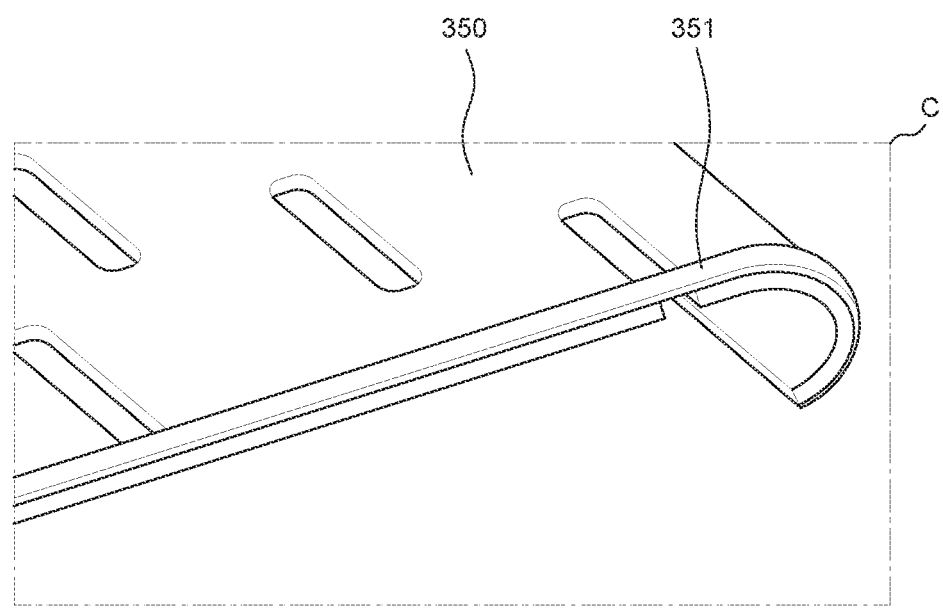
FIG. 9B is an enlarged view of a region C of FIG. 9A.

FIG. 9A is a perspective view of a display device according to yet another exemplary embodiment of the present disclosure. FIG. 9B is an enlarged view of a region C of FIG. 9A. A display device 300 shown in FIG. 9A and FIG. 9B has substantially the same configuration as the display device 100 shown in FIG. 1 through FIG. 7 except a sub-plate 350. Thus, for convenience of description, FIG. 9A and FIG. 9B illustrate the display panel 110, the back plate 120 and the sub-plate 350 among the components of the display device 300, and a repeated description will be omitted or may be briefly provided.

Referring to FIG. 9A and FIG. 9B, the sub-plate 350 further includes a protection member 351. The protection member 351 can be extended in the first direction along both side edges of the sub-plate 350. The protection member 351 can be disposed to cover a side surface of the display panel 110. Particularly, the protection member 351 can be disposed to cover a side surface of the second display area DA2. The protection member 351 can have the same thickness as the display panel 110, but is not limited thereto. When the second display area DA2 is exposed on a front surface of the display device 300, the side surface of the display panel 110 can be protected by the protection member 351. Therefore, it is possible to further enhance the durability of the display panel 110 and also possible to improve the reliability of the display device 300.

The exemplary embodiments of the present disclosure can also be described as follows:

According to an aspect of the present disclosure, a display device includes a display panel including a first display area and a second display area extended from the first display area; a support member that supports the first display area; a bottom cover coupled to the support member; an inner case configured to bend a part of the second display area and to be movable along an extension direction of the display panel; and a sub-plate disposed between the inner case and the second display area so as to be extended from an end portion of the support member. In a first mode, the first display area and the second display area overlap each other with the inner case interposed therebetween. In a second mode, an end portion of the second display area overlaps the second display area, e.g., a portion of the second display area.

The support member can have the same thickness as the sub-plate.

The display device can further include a back plate that is in contact with a rear surface of the display panel and supports the display panel. A part of the back plate corresponding to the second display area and the sub-plate can include a plurality of holes.

The plurality of holes in the back plate can be different in size from the plurality of holes in the sub-plate.

The display device can further include a protection member on the sub-plate so as to cover a side surface of the display panel.

The display device can further include sliding guides on a pair of inner side surfaces of the bottom cover facing each other and protruding toward the inner case. The inner case can include guide grooves corresponding to the sliding guides.

The display device can further include a stopper on a bottom surface of the bottom cover and protruding toward the display panel. The inner case can be in contact with the stopper in the first mode.

The inner case can be configured to move toward an outside or an inside of a space between the support member and the bottom cover. The inner case can have been moved maximally in a direction close to the first display area in the first mode, and the inner case can have been moved maximally in a direction away from the first display area in the second mode.

An end portion of the second display area can be disposed inside a space between the support member and the bottom cover in the first mode, and the end portion of the second display area can be disposed outside the space in the second mode.

The display device can further include a back case that covers a bended part of the second display area and moves together with the inner case. The back case can be in contact with the bottom cover in the first mode, and the back case can be spaced apart from the bottom cover in the second mode.

According to another aspect of the present disclosure, a display device includes a display panel including a main display area and a sub-display area; a support member that supports the main display area; a sub-plate disposed to be extended from the support member and configured to support the sub-display area; a bottom cover coupled to a bottom portion of the support member; and a sliding case configured to bend a part of the sub-display area and to be movable toward an outside or an inside of a space between the support member and the bottom cover. The sub-plate is disposed between the sub-display area and the sliding case and configured to reduce a step between a top surface of the support member and a top surface of the sliding case.

The support member can have the same thickness as the sub-plate.

The display device can further include a stopper on a bottom surface of the bottom cover and protruding toward the display panel. The stopper can be configured to stop a movement of the sliding case.

The display device can further include sliding guides on a pair of inner side surfaces of the bottom cover facing each other and protruding in parallel with a moving direction of the sliding case. The sliding case can include guide grooves corresponding to the sliding guides.

The display device can further include a protection member on the sub-plate so as to cover a side surface of the display panel.

The display device can further include a back plate that is in contact with a rear surface of the display panel and supports the display panel. A part of the back plate corresponding to the sub-display area and the sub-plate can include a plurality of holes.

The plurality of holes in the back plate can be different in size from the plurality of holes in the sub-plate.

The display device can be configured to switch to a first mode or a second mode as the sliding case is moved. The sliding case can have been moved maximally in a direction close to the main display area in the first mode, and the sliding case can have been moved maximally in a direction away from the main display area in the second mode.

The main display area and the sub-display area can overlap each other with the sliding case interposed therebetween in the first mode, and the main display area and the sub-display area may not overlap each other in the second mode.

An end portion of the sub-display area can be disposed inside the space in the first mode, and the end portion of the sub-display area can be disposed outside the space in the second mode.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
a display panel including a first display area and a second display area extended from the first display area;
a support member configured to support the first display area;
a bottom cover coupled to the support member;
an inner case configured to bend a part of the second display area and to be movable along an extension direction of the display panel; and
a sub-plate disposed between the inner case and the second display area so as to be extended from an end portion of the support member,
wherein in a first mode, the first display area and the second display area overlap each other with the inner case interposed therebetween,
in a second mode, an end portion of the second display area overlaps a portion of the second display area, and
wherein the sub-plate includes a plurality of holes.

2. The display device according to claim 1, wherein the support member has a same thickness as the sub-plate.

3. The display device according to claim 1, further comprising:
a back plate that is in contact with a rear surface of the display panel and supports the display panel,
wherein a part of the back plate corresponding to the second display area includes a plurality of holes.

4. The display device according to claim 3, wherein the plurality of holes in the back plate is different in size from the plurality of holes in the sub-plate.

5. The display device according to claim 1, further comprising:
a protection member on the sub-plate so as to cover a side surface of the display panel.

6. The display device according to claim 1, further comprising:
a plurality of sliding guides on a pair of inner side surfaces of the bottom cover facing each other, and protruding toward the inner case,
wherein the inner case includes a plurality of guide grooves corresponding to the plurality of sliding guides.

7. The display device according to claim 1, further comprising:
a stopper on a bottom surface of the bottom cover, and protruding toward the display panel, and
wherein the inner case is in contact with the stopper in the first mode.

8. The display device according to claim 1, wherein the inner case is configured to move toward an outside or an inside of a space between the support member and the bottom cover,
the inner case is moved maximally in a direction close to the first display area in the first mode, and
the inner case is moved maximally in a direction away from the first display area in the second mode.

9. The display device according to claim 1, wherein the end portion of the second display area is disposed inside a space between the support member and the bottom cover in the first mode, and
the end portion of the second display area is disposed outside the space in the second mode.

10. The display device according to claim 1, further comprising:
a back case that covers a bended part of the second display area and moves together with the inner case,
wherein the back case is in contact with the bottom cover in the first mode, and
the back case is spaced apart from the bottom cover in the second mode.

11. A display device, comprising:
a display panel including a main display area and a sub-display area;
a support member configured to support the main display area;
a sub-plate disposed to be extended from the support member and configured to support the sub-display area;
a bottom cover coupled to a bottom portion of the support member; and
a sliding case configured to bend a part of the sub-display area and to be movable toward an outside or an inside of a space between the support member and the bottom cover,
wherein the sub-plate is disposed between the sub-display area and the sliding case, and is configured to reduce a step between a top surface of the support member and a top surface of the sliding case, and
wherein the sub-plate includes a plurality of holes.

12. The display device according to claim 11, wherein the support member has a same thickness as the sub-plate.

13. The display device according to claim 11, further comprising:
a stopper on a bottom surface of the bottom cover and protruding toward the display panel, and
wherein the stopper is configured to stop a movement of the sliding case.

14. The display device according to claim 11, further comprising:
a plurality of sliding guides on a pair of inner side surfaces of the bottom cover facing each other, and protruding in parallel with a moving direction of the sliding case, and
wherein the sliding case includes a plurality of guide grooves corresponding to the plurality of sliding guides.

15. The display device according to claim 11, further comprising:
a protection member on the sub-plate so as to cover a side surface of the display panel.

16. The display device according to claim 11, further comprising:
a back plate that is in contact with a rear surface of the display panel and supports the display panel,
wherein a part of the back plate corresponding to the sub-display area includes a plurality of holes.

17. The display device according to claim 16, wherein the plurality of holes in the back plate is different in size from the plurality of holes in the sub-plate.

18. The display device according to claim 11, wherein the display device is configured to switch to a first mode or a second mode as the sliding case is moved,
the sliding case is moved maximally in a direction close to the main display area in the first mode, and
the sliding case is moved maximally in a direction away from the main display area in the second mode.

19. The display device according to claim 18, wherein the main display area and the sub-display area overlap each other with the sliding case interposed therebetween in the first mode, and
the main display area and the sub-display area do not overlap each other in the second mode.

20. The display device according to claim 18, wherein an end portion of the sub-display area is disposed inside the space in the first mode, and
the end portion of the sub-display area is disposed outside the space in the second mode.

* * * * *